United States Patent
Sharma et al.

(10) Patent No.: US 10,193,809 B1
(45) Date of Patent: Jan. 29, 2019

(54) LOAD BALANCING METHODS BASED ON TRANSPORT LAYER PORT NUMBERS FOR A NETWORK SWITCH

(71) Applicant: CISCO TECHNOLOGY, INC., San Jose, CA (US)

(72) Inventors: Samar Sharma, San Jose, CA (US); Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 14/871,561

(22) Filed: Sep. 30, 2015

(51) Int. Cl.
*H04L 12/803* (2013.01)
*H04L 12/66* (2006.01)

(52) U.S. Cl.
CPC ............ *H04L 47/125* (2013.01); *H04L 12/66* (2013.01)

(58) Field of Classification Search
CPC .... H04L 47/125; H04L 67/1002; G06F 9/505
See application file for complete search history.

(56) References Cited

U.S. PATENT DOCUMENTS

| | | | |
|---|---|---|---|
| 6,643,260 B1 | 11/2003 | Kloth | |
| 6,683,873 B1 | 1/2004 | Kwok | |
| 6,735,631 B1 | 5/2004 | Oehrke | |
| 6,996,615 B1 | 2/2006 | McGuire | |
| 7,062,571 B1 * | 6/2006 | Dale | H04L 67/1002 709/239 |
| 7,313,667 B1 | 12/2007 | Pullela | |
| 7,536,476 B1 | 5/2009 | Alleyne | |
| 7,567,504 B2 | 7/2009 | Darling | |
| 7,808,897 B1 | 10/2010 | Mehta et al. | |
| 8,284,664 B1 | 10/2012 | Aybay | |
| 8,510,469 B2 | 8/2013 | Portolani | |
| 8,611,356 B2 | 12/2013 | Yu | |
| 9,432,294 B1 | 8/2016 | Sharma et al. | |
| 9,444,744 B1 | 9/2016 | Sharma et al. | |
| 2003/0056001 A1 | 3/2003 | Mate | |
| 2004/0004941 A1 | 1/2004 | Malan | |
| 2004/0264481 A1 | 12/2004 | Darling | |
| 2005/0125424 A1 | 6/2005 | Herriott | |
| 2006/0104286 A1 | 5/2006 | Cheriton | |
| 2006/0155875 A1 | 7/2006 | Cheriton | |
| 2008/0084880 A1 * | 4/2008 | Dharwadkar | H04L 12/4641 370/392 |

(Continued)

OTHER PUBLICATIONS

U.S. Appl. No. 14/696,209, filed Apr. 24, 2015, entitled "Line-Rate Selective Load Balancing of Permitted Network Traffic," Inventor(s): Samar Sharma, et al.
USPTO Aug. 26, 2015 Non-Final Office Action from U.S. Appl. No. 14/696,209.
USPTO Feb. 10, 2016 Final Office Action from U.S. Appl. No. 14/696,209.
U.S. Appl. No. 14/696,226, filed Apr. 24, 2015, entitled "Load Balancing Methods for a Network Switch," Inventor(s): Samar Sharma, et al.

(Continued)

*Primary Examiner* — Marsha D Banks Harold
*Assistant Examiner* — Elton Williams

(57) ABSTRACT

In one embodiment, a network element that performs network traffic bridging receives load balancing criteria comprising an indication of at least one transport layer port number and an indication of a plurality of network nodes. A plurality of forwarding entries are created based on the load balancing criteria. A forwarding entry specifies the at least one transport layer port number and a network node of the plurality of network nodes. The network element applies the plurality of forwarding entries to network traffic to load balance, among the plurality of network nodes, network traffic that matches the at least one transport layer port number.

20 Claims, 4 Drawing Sheets

| 400 | DEVICE GROUP | SOURCE L4 PORT |
|---|---|---|
| | 1.1.1.1.1; 1.1.1.2; 1.1.1.3; 1.1.1.4 | 80 |

| 450 | OPERATION | PORT IDENTIFIER | DESTINATION L4 PORT | SOURCE L4 PORT |
|---|---|---|---|---|
| 452a | REDIRECT | (0x60) | 1024-1223 | 80 |
| 452b | REDIRECT | (0x61) | 1224-1423 | 80 |
| 452c | REDIRECT | (0x5f) | 1424-1623 | 80 |
| 452d | REDIRECT | (0x62) | 1624-1823 | 80 |

(56) References Cited

U.S. PATENT DOCUMENTS

| | | |
|---|---|---|
| 2011/0055470 A1 | 3/2011 | Portolani |
| 2011/0090789 A1* | 4/2011 | Fung .................. H04L 41/5025 370/230 |
| 2011/0110382 A1 | 5/2011 | Jabr et al. |
| 2011/0116443 A1 | 5/2011 | Yu et al. |
| 2011/0261811 A1* | 10/2011 | Battestilli ............. H04L 47/125 370/389 |
| 2012/0201135 A1* | 8/2012 | Ding ....................... H04L 45/24 370/230.1 |
| 2014/0006535 A1 | 1/2014 | Reddy |
| 2014/0075108 A1 | 3/2014 | Dong |
| 2014/0282611 A1 | 9/2014 | Campbell et al. |
| 2014/0372567 A1 | 12/2014 | Ganesh |
| 2015/0117458 A1 | 4/2015 | Gurkan et al. |
| 2015/0215819 A1 | 7/2015 | Bosch |
| 2016/0094643 A1* | 3/2016 | Jain ........................ H04L 45/44 709/226 |
| 2016/0182378 A1* | 6/2016 | Basavaraja ........... H04L 45/745 370/235 |

OTHER PUBLICATIONS

USPTO Oct. 17, 2016 Notice of Allowance from U.S. Appl. No. 14/696,200.

USPTO Dec. 9, 2016 Non-Final Office Action from U.S. Appl. No. 14/696,226.

USPTO Jan. 20, 2017 Non-Final Office Action from U.S. Appl. No. 14/696,200.

USPTO Feb. 2, 2017 Non-Final Office Action from U.S. Appl. No. 14/693,925.

U.S. Appl. No. 14/696,200, filed Apr. 24, 2015, entitled "Statistical Operations Associated With Network Traffic Forwarding," Inventor(s): Samar Sharma, et al.

U.S. Appl. No. 14/693,925, filed Apr. 23, 2015, entitled "Selective Load Balancing of Network Traffic," Inventor(s): Samar Sharma, et al.

* cited by examiner

| 300 → | DEVICE GROUP | DESTINATION L4 PORT |
|---|---|---|
| | 1.1.1.1.1; 1.1.1.2; 1.1.1.3; 1.1.1.4 | 80, 102, 5222-5223 |

| 350 → | OPERATION | PORT IDENTIFIER | DESTINATION L4 PORT | SOURCE L4 PORT |
|---|---|---|---|---|
| 352a | REDIRECT | (0x60) | 80, 102, 5222-5223 | 0-16383 |
| 352b | REDIRECT | (0x61) | 80, 102, 5222-5223 | 16384-32767 |
| 352c | REDIRECT | (0x5f) | 80, 102, 5222-5223 | 32768-49151 |
| 352d | REDIRECT | (0x62) | 80, 102, 5222-5223 | 49152-65535 |

FIG. 3

| 400 → | DEVICE GROUP | SOURCE L4 PORT |
|---|---|---|
| | 1.1.1.1.1; 1.1.1.2; 1.1.1.3; 1.1.1.4 | 80 |

| 450 → | OPERATION | PORT IDENTIFIER | DESTINATION L4 PORT | SOURCE L4 PORT |
|---|---|---|---|---|
| 452a | REDIRECT | (0x60) | 1024-1223 | 80 |
| 452b | REDIRECT | (0x61) | 1224-1423 | 80 |
| 452c | REDIRECT | (0x5f) | 1424-1623 | 80 |
| 452d | REDIRECT | (0x62) | 1624-1823 | 80 |

FIG. 4

LOAD BALANCING METHODS BASED ON TRANSPORT LAYER PORT NUMBERS FOR A NETWORK SWITCH

TECHNICAL FIELD

This disclosure relates in general to the field of communications and, more particularly, to load balancing methods based on transport layer port numbers for a network switch.

BACKGROUND

A network element may include one or more ingress ports and one or more egress ports. The network element may receive network traffic through the ingress ports. As an example, network traffic may include one or more packets containing control information and data. The network element may perform various operations on the network traffic to select one or more of the egress ports for forwarding the network traffic. The network element then forwards the network traffic on to one or more devices coupled to the network element through the one or more egress ports.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 illustrates example load balancing criteria specifying transport layer source port based load balancing and traffic forwarding entries in accordance with certain embodiments.

FIG. 4 illustrates example load balancing criteria specifying transport layer destination port based load balancing and traffic forwarding entries in accordance with certain embodiments.

DETAILED DESCRIPTION OF EXAMPLE EMBODIMENTS

Overview

In one embodiment, a network element that performs network traffic bridging receives load balancing criteria comprising an indication of at least one transport layer port number and an indication of a plurality of network nodes. A plurality of forwarding entries are created based on the load balancing criteria. A forwarding entry specifies the at least one transport layer port number and a network node of the plurality of network nodes. The network element applies the plurality of forwarding entries to network traffic to load balance, among the plurality of network nodes, network traffic that matches the at least one transport layer port number.

Example Embodiments

Figure 1:
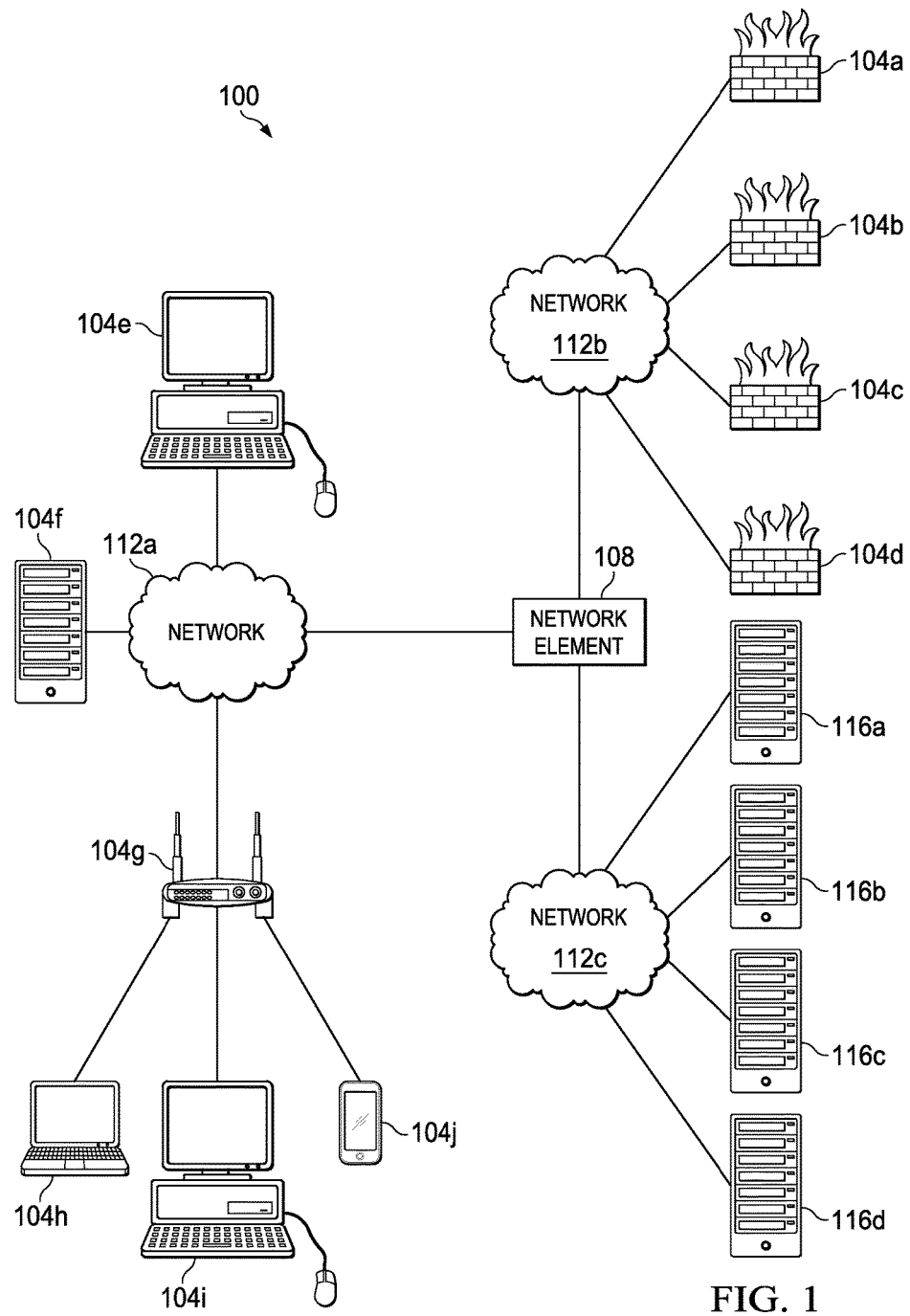
FIG. 1 illustrates a block diagram of a system for load balancing network traffic based on transport layer port numbers in accordance with certain embodiments.

FIG. 1 illustrates a block diagram of a system 100 for load balancing network traffic based on transport layer port numbers in accordance with certain embodiments. System 100 includes various network nodes 104 and 116 coupled to network element 108 via networks 112. In operation, network element 108 forwards network traffic (e.g., data packets) from one or more network nodes 104 or 116 or an internal component of network element 108 to one or more other network nodes 104 or 116 or an internal component of network element 108.

In various embodiments of the present disclosure, network element 108 implements load balancing based on one or more transport layer port numbers. Load balancing based on transport layer port numbers may allow the network element 108 to load balance traffic destined to or originating from one or more particular applications, since particular applications may utilize well-known transport layer port numbers.

In some systems, a network appliance may be used to load balance network traffic, but such a system would introduce latency that is undesirable in a network element, such as a network switch, that is used for high speed bridging and/or routing operations since a network appliance would perform these functions in software (i.e., a processor of the network appliance would execute instructions in order to perform these functions). Various embodiments of the present disclosure provide systems and methods for a hardware based load balancing of network traffic based on transport layer port numbers of the traffic. Such embodiments are able to perform very high speed load balancing operations. Indeed, in various embodiments, load balancing is performed at a line-rate of the network element 108.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, loadbalancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with load-balancing network traffic. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 or 116 may be any device or system operable to exchange, transmit, and/or receive information in a network environment. For example, network nodes may include network switches, routers, servers (physical servers or servers virtually implemented on physical hardware) (e.g., servers 104*a-d*, 104*f*, and 116*a-d*), machines (physical machine or machines virtually implemented on physical hardware), end user devices (such as laptop 104*h*, desktop computers 104*e* and 104*i*, smartphone 104*j*), access points (e.g., 104*g*), cable boxes, gateways, bridges, loadbalancers, firewalls (e.g., 104*a-d*), inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or 116 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

A network 112 represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) and/or other communications for the transmission and/or reception of packets in a network.

Figure 2:
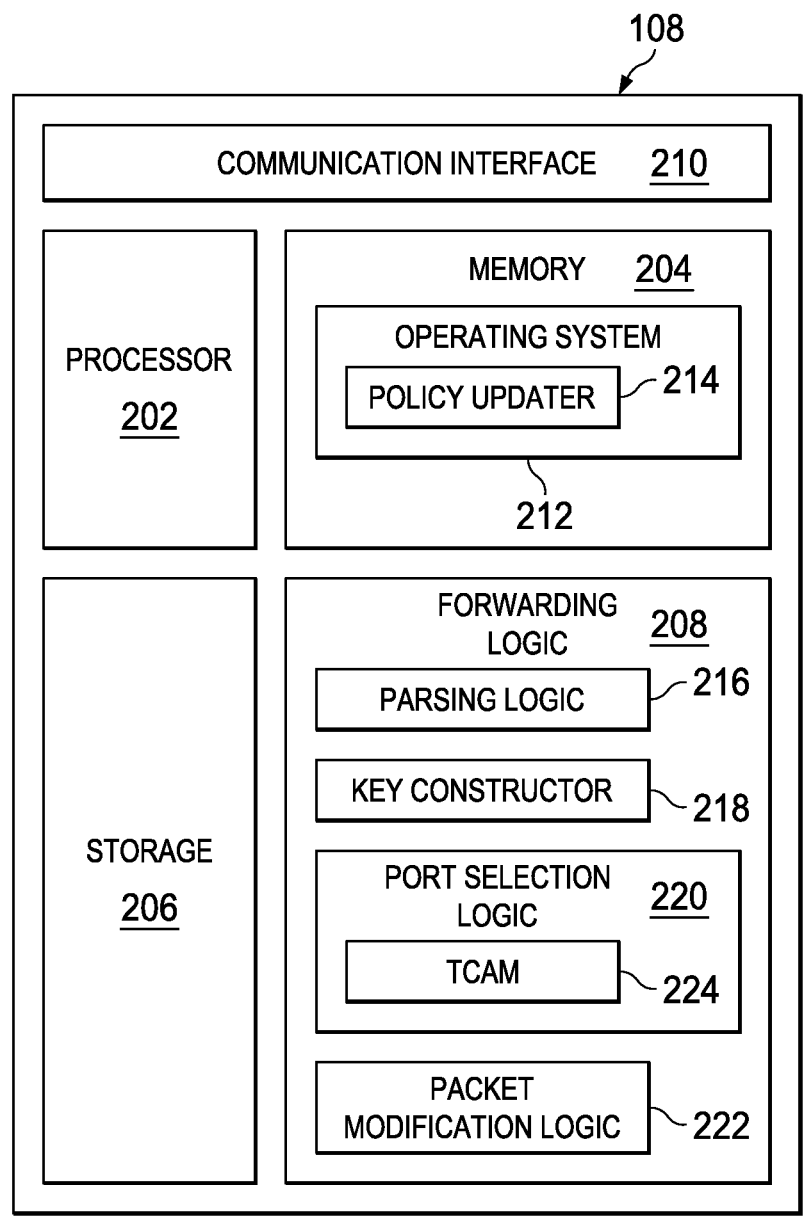
FIG. 2 illustrates a block diagram of a network element that performs load balancing based on transport layer port numbers in accordance with certain embodiments.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and/or a display. As an example, network element 108 comprises a computer system that includes one or more processors 202, memory 204, storage 206, and one or more communication interfaces 210. These components may work together in order to provide functionality described herein. Network element may also comprise forwarding logic 208. Forwarding logic 208 may be operable to apply user-specified traffic forwarding rules to traffic received via communication interface 210 and send the traffic processed by the rules to communication interface 210 for forwarding out of the appropriate egress port of network element 108.

Communication interface 210 may be used for the communication of signaling and/or data between network element 108 and one or more networks (e.g., 112a or 112b) and/or network nodes 104 or 116 coupled to a network 112. For example, communication interface 210 may be used to send and receive network traffic such as data packets. Each communication interface 210 may send and receive data and/or signals according to a distinct standard such as Asynchronous Transfer Mode (ATM), Frame Relay, or Gigabit Ethernet (or other IEEE 802.3 standard). In a particular embodiment, communication interface 210 comprises one or more ports that may each function as an ingress and/or egress port. As one example, communication interface 210 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 204 and/or storage 206 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 204 and/or storage 206 may store any suitable data or information utilized by network element 108, including software embedded in a computer readable medium, and/or encoded logic incorporated in hardware or otherwise stored (e.g., firmware). Memory 204 and/or storage 206 may also store the results and/or intermediate results of the various calculations and determinations performed by processor 202.

In certain example implementations, the customized traffic forwarding functions (e.g., load balancing operations based on transport layer port numbers) outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein may be construed as being encompassed within the broad term 'memory element.' Similarly, any of the potential processing elements, modules, and machines described in this Specification may be construed as being encompassed within the broad term 'processor.'

In one implementation, a network element 108 described herein may include software to achieve (or to facilitate) the functions discussed herein for customized traffic forwarding where the software is executed on one or more processors 202 to carry out the functions. This could include the implementation of one or more instances of an operating system 212, policy updater 214, and/or any other suitable elements that foster the activities discussed herein. In other embodiments, one or more of these elements may be implemented in hardware and/or firmware such as reprogrammable logic in an FPGA or ASIC.

In some embodiments, the operating system 212 provides an application program interface (API) that allows a network administrator to provide information to the network element 108. For example, the API may allow the network administrator to specify traffic customization information such as a method of load balancing (e.g., transport layer source port based load balancing or transport layer destination port based load balancing), indications of which traffic should be load balanced (e.g., by identifying specific transport layer port numbers), and indications of network nodes that the load balanced network traffic will be sent to (e.g., a device group). In various embodiments, a network administrator may specify the traffic customization information through one or more interfaces, such as a command-line interface (CLI) (e.g., manually entered or entered via a script) or a graphical user interface (GUI) using any suitable programming language (e.g., Extensible Markup Language (xml) or Python).

The operating system 212 may be capable of communicating the traffic customization information received from the network administrator to other portions of network element 108 (e.g., to forwarding logic 208). In particular embodiments, the operating system 212 is operable to utilize a policy updater 214 to program logic of network element 108 based on traffic customization information received by the operating system 212 (e.g., from the network administrator).

In various embodiments, the operating system 212 receives traffic customization information and communicates with forwarding logic 208 to implement traffic forwarding that complies with the traffic customization information. In various embodiments, the traffic customization information is converted into a format suitable for use by forwarding logic 208 (e.g., "forwarding entries" as described herein) before being communicated to forwarding logic 208. In other embodiments, the traffic customization information is received by the operating system 212 in a format used by forwarding logic 208, such that no conversion is needed. In yet other embodiments, forwarding logic 208 may convert the traffic customization information into a format suitable for use by forwarding logic 208. In some embodiments, traffic customization information may be applied to traffic received via a single port of network element 108 or to traffic received through multiple ports of the network element. Different traffic customization information may be applied to different ports. For example, one ingress port might load balance traffic having a particular transport layer source port (e.g., based on the destination ports of the traffic) while another ingress port might load balance traffic having a particular transport layer destination port (e.g., based on the source ports of the traffic).

"Transport layer" as used herein may refer to layer 4 (L4) of the Open Systems Interconnect (OSI) model, and may include any suitable transport layer protocol such as the Transmission Control Protocol (TCP), the User Datagram Protocol (UDP), or other transport layer protocol. A transport layer port number may include an Internet socket port number used by a transport layer protocol for the establishment of host-to-host connectivity. When a network node (e.g., 104f) desires a transport layer connection with a destination node (e.g., server 116a), the network node may generate packets specifying a transport layer source port associated with the originating network node (e.g., 104f) and a transport layer destination port associated with the destination network node (e.g., 116a).

In general, the network node may use any suitable transport layer source port for the traffic, but may select a transport layer destination port associated with a particular application that the traffic pertains to. For example, particular port numbers are designated as well-known ports officially by the Internet Assigned Numbers Authority (IANA) or de facto through common industry use. In general, ports 0-1023 are designated as well-known ports while ports 1024 to 49,151 may be registered ports (e.g., they may be assigned by IANA upon application by a requesting entity). Various examples of port numbers that are recognized as being associated with a particular type of application include ports 20-21 for File Transfer Protocol (FTP), port 22 for Secure Shell (SSH), port 25 for Simple Mail Transfer Protocol (SMTP), port 53 for Domain Name System (DNS), port 80 for Hypertext Transfer Protocol (HTTP), port 102 for Microsoft Exchange, port 110 for Post Office Protocol 3 (POP3), and ports 5222-5223 for Extensible Messaging and Presence Protocol (XMPP). These examples are a few among hundreds of applications that are associated with distinct ports.

When the destination network node (e.g., 116a) sends return traffic associated with the connection to the originating network node (e.g., 104f), the traffic may include a transport layer source port that is equivalent to the transport layer destination port of the traffic that was sent from the originating network node to the destination network node. Similarly, the return traffic may include a transport layer destination port that is equivalent to the transport layer source port of the traffic that was sent from the originating network node to the destination network node. In the embodiment depicted, if traffic from clients 104 is to be load balanced among servers 116, then the transport layer destination port may be associated with the network element 108 which may have a virtual IP address to which clients may send traffic that is then load balanced among servers 116 (alternatively, servers 116 may share an IP address). When the particular server (e.g., 116a) sends return traffic to the client, it may include the transport layer destination port specified by the client as the traffic's source port.

In some embodiments, when an originating network node creates multiple transport layer connections with a destination node to communicate traffic for the same application (e.g., HTTP), the originating network node may select different transport layer source ports for each connection. For example a first connection may have a source port of 0 and a destination port of 80, a second connection may have a source port of 1 and a destination port of 80, a third port may have a source port of 2 and a destination port of 80, and so on.

The traffic customization information may specify a load balancing scheme. For example, with respect to the embodiment depicted in FIG. 1, a load balancing scheme may specify how traffic forwarded by network element 108 is to be distributed among a group of network nodes (e.g., network nodes 104*a-d* represented as firewalls or servers 116*a-d*). Network element 108 may load balance among any number of suitable network nodes 104, such as firewalls, application servers, web cache servers, other load balancers (e.g., load balancers that perform load balancing in software), inspection devices, etc. In the embodiment depicted in FIG. 1, load balancing may be performed in either direction. As one example, traffic received from network 112*a* may be load balanced among network nodes 104*a-d*, passed back to network element 108, and then sent to one or more network nodes 116*a-d* (e.g., depending on the load balancing scheme set up for the port(s) the traffic is received on the traffic may be load balanced among nodes 116*a-d* or it could be sent to a particular node such as 116*a*). As another example, traffic received through network 112*a* may be load balanced among network nodes 116*a-d*. As another example, traffic received from one or more network nodes 116 might be load balanced among network nodes 104*a-d* (e.g., firewalls, web cache servers, or other network nodes), processed by the network nodes, sent back to network element 108, and then sent to its destination (e.g., one or more of network nodes 104*e-104j*).

Example load balancing schemes include a transport layer destination port based load balancing scheme and a transport layer source port based load balancing scheme. A transport layer destination port based load balancing scheme may load balance incoming network traffic onto various egress ports (each coupled to a different network node of a device group) based on the destination ports of the network traffic when a transport layer source port of the network traffic matches a transport layer source port specified in the load balancing criteria. In some embodiments, multiple transport layer source ports may be specified in the load balancing criteria. Accordingly, network traffic having a transport layer source port that matches any of the transport layer source ports specified in the load balancing criteria may be load balanced onto various egress ports based on the destination ports specified in the network traffic.

A transport layer source port based load balancing scheme may load balance incoming network traffic onto various egress ports (each coupled to a different network node of a device group) based on the source ports in the network traffic when a transport layer destination port of the network traffic matches a transport layer destination port specified in the load balancing criteria. In some embodiments, multiple transport layer destination ports may be specified in the load balancing criteria. Accordingly, network traffic having a transport layer destination port that matches any of the transport layer destination ports specified in the load balancing criteria may be load balanced onto various egress ports based on the source ports specified in the network traffic.

In particular embodiments, a user may specify load balancing criteria for a particular ingress port, a group of ingress ports, or all ingress ports of network element 108. The load balancing criteria may specify a load balancing scheme (e.g., transport layer source port based or transport layer destination port based) along with an indication of one or more transport layer source ports or destination ports specifying which traffic should be load balanced. The load balancing criteria may also specify a device group comprising a group of network nodes to which the load balanced traffic should be sent. Network element 108 may receive the specified scheme and device group and configure itself to perform the specified load balancing scheme.

In some embodiments, other information may be specified in load balancing criteria such that only traffic matching the specified criteria is load balanced. For example, in addition to one or more transport layer source and/or destination port numbers, the network traffic may also need to include one or more of a source address (e.g., IP address, MAC address, or other address), a destination address (e.g., IP address, MAC address, or other address), a VLAN identifier, a QoS value, or other suitable information specified in the load balancing criteria.

In particular embodiments, network element 108 may generate forwarding entries based on the load balancing criteria specified by the user to effectuate the desired load balancing method. For example, if the specified load balancing scheme is transport layer destination port based load balancing, the network element 108 may determine that a first plurality of transport layer destination ports should be associated with a first network node of the specified device group, a second plurality of transport layer destination ports should be associated with a second network node of the device group, and so on. When a received data packet includes the transport layer source port specified in the load balancing criteria and a transport layer destination port associated with the first network node, the network element redirects the data packet to a port coupled to the first network node, when a received data packet includes the transport layer source port specified in the load balancing criteria and a transport layer destination port associated with the second network node, the network element redirects the data packet to a port coupled to the second network node, and so on. In various embodiments, this may be accomplished by creating a forwarding entry for each network node of the device group.

Similarly, if the specified load balancing scheme is transport layer source port based, the network element 108 may determine that a first plurality of transport layer source ports should be associated with a first network node of the specified device group, a second plurality of transport layer source ports should be associated with a second network node of the device group, and so on. When a received data packet includes the transport layer destination port specified in the load balancing criteria and a transport layer source port associated with the first network node, the network element redirects the data packet to a port coupled to the first network node, when a received data packet includes the transport layer destination port specified in the load balancing criteria and a transport layer destination source associated with the second network node, the network element redirects the data packet to a port coupled to the second network node, and so on. In various embodiments, this may be accomplished by creating a forwarding entry for each network node of the device group.

In determining the range of transport layer source ports (when the load balancing method is transport layer source port based) that will be applicable to each forwarding entry (where each forwarding entry corresponds to one network node to which load balanced traffic will be delivered to), the network element 108 may utilize any suitable methodology. In one embodiment, network element 108 may divide all possible source ports (65,536 in current L4 transport protocols such as TCP and UDP) up among the forwarding entries. Thus, if four network nodes are available in a device group to receive load balanced traffic, then each network node will be associated with 16,384 transport layer source ports through its corresponding forwarding entry.

Alternatively, the ports specified in the forwarding entries may be divided up among a subset of the possible available source ports (when a transport layer source port based load balancing scheme is specified). As one example, a user may specify a range of source ports that are expected, and the network element may create forwarding entries that each specify the destination port to be load balanced as well as a portion of the range of source ports specified by the user. For example, a user may desire to load balance HTTP traffic sent to port 80, but may specify that only traffic specifying source ports 0-999 need to be load balanced. Accordingly, if the traffic is load balanced among a device group having four network nodes, four traffic forwarding entries may be created that each specify port 80 for the destination port and a group of 250 source ports (selected from source ports 0-999). In other embodiments, the user could specify which source ports should be associated (via a forwarding entry) with a network node of the device group. In some embodiments, the user may specify a weight for each network node in the device group, specifying the percentage of load balanced traffic the network node should receive and the distribution of the port numbers in the forwarding entries may be generated accordingly. Similar schemes may be applied in specifying the destination ports for traffic forwarding entries when a transport layer destination port based load balancing scheme is used.

In some embodiments, the load balancing scheme may be expressed at a higher level of abstraction than one or more corresponding forwarding entries that are created based on the load balancing scheme. For example, the load balancing scheme may merely specify whether the load balancing should be performed based on the transport layer source port (and the destination port(s) and/or other criteria that must match for the traffic to be load balanced) or the transport layer destination port (and the source port(s) and/or other criteria that must match for the traffic to be load balanced). As another example, the load balancing scheme may also specify one or more weights associated with the network nodes of the device group (e.g., the load balancing scheme may specify that the traffic should be distributed equally among all network nodes of the device group or that one or more particular network nodes should receive more traffic than others). The network element 108 may determine assignments of port numbers for the forwarding entries that are used to redirect the network traffic to effectuate the specified load balancing criteria.

In various embodiments, operating system 212 or other network element component may update the forwarding entries resulting from the load balancing criteria in response to a change in network topology (e.g., when an additional network node 104 becomes available to load balance traffic or one of the network nodes 104a-d becomes unavailable to load balance traffic). The additional network node may be specified by a change in the device group, or it may have been previously included in a device group and come back online after a period of unavailability. In particular embodiments, adjusting to the network topology may include changing the range of source or destination ports that correspond to the network nodes in the device group which may involve changing the forwarding entries that implement the load balancing scheme.

As mentioned earlier, the policy updater 214 may be responsible for sending the forwarding entries to the forwarding logic 208 to be implemented. As one example, the policy updater 214 may instruct that the forwarding entries be programmed into a memory such as a content addressable memory (e.g., TCAM 224) of the port selection logic 220 (e.g., by calling a hardware driver associated with the TCAM).

Forwarding logic 208 is operable to apply the forwarding entries to network traffic received by network element 108. In the embodiment depicted, forwarding logic 208 includes parsing logic 216, key construction logic 218, port selection logic 220, and packet modification logic 222. In various embodiments, any suitable portion of forwarding logic 208 may comprise programmable logic (e.g., software/computer instructions executed by a processor), fixed logic, programmable digital logic (e.g., an FPGA, an EPROM, an EEPROM, or other device), an ASIC that includes digital logic, software, code, electronic instructions, or any suitable combination thereof. In a particular embodiment, forwarding logic 208 comprises an ASIC or other device that is operable to perform customized traffic forwarding in hardware by utilizing logic (e.g., one or more memories such as TCAM 224) that is reprogrammable by an entity (e.g., the operating system 212) based on traffic customization information (e.g., received from a network administrator). In such an embodiment, the functions of parsing logic 216, key construction logic 218, port selection logic 220, and packet modification logic 222 are performed in hardware by such logic (in contrast to an implementation where such functions may be performed through software instructions executed by a network processor). Reconfiguration of the logic may be performed by storing different values in memory of the forwarding logic 208 such as TCAM 224 or other memory element while the rest of the forwarding logic 208 remains fixed. In various embodiments, the values stored in the memory may provide control inputs to forwarding logic 208, but are not typical instructions that are part of an instruction set executed by a processor. By implementing this logic in hardware, the network element 108 may process incoming traffic (e.g., switch/bridge the traffic) at much higher speeds (e.g., at line rate) than an appliance that utilizes a network processor to process incoming network traffic.

Parsing logic 216 may be operable to receive packets from the ingress ports of network element 108. The parsing logic 216 may be configured to parse information from a received packet. Parsing logic 216 may be configured to parse any suitable information, such as one or more protocols associated with (e.g., included within) the packet, a source address (e.g., IP address, MAC address, or other address) of the packet, a destination address (e.g., IP address, MAC address, or other address) of the packet, one or more ports (e.g., a transport layer source or destination port) associated with the packet, a VLAN identifier, a QoS value, or other suitable information from the packet. In some embodiments, the information to be parsed by parsing logic 216 is based on the information included within various forwarding entries of network element 108 (which could include forwarding entries associated with various different ports of network element 108). In some embodiments, the parsing logic 216 is configured on a port-by-port basis, such that packets from each port may be parsed based on the forwarding entries associated with that port. In various embodiments, parsing logic 216 may parse any suitable portions of one or more of these values. For example, parsing logic 216 may parse one or more bits of the transport layer source port and/or transport layer destination port for comparison with values specified in forwarding entries.

The information parsed by parsing logic 126 is passed to key construction logic 218. Key construction logic constructs a key from the output of the parsing logic 126. The key may contain all or a portion of the information parsed from a packet. As one example, if a port number is parsed from an incoming packet, but forwarding logic only requires a portion of the port number, then the key constructor may generate a key that only includes the portion of the port number. As another example, if parsing logic 126 parses a transport layer source port number and a transport layer destination port number, but only the source port number is needed (e.g., when a source port based load balancing scheme that does not utilize the destination port numbers is in effect), the key construction logic 218 may omit the destination port number from the generated key. The key is then passed to the port selection logic 220.

Prior to receiving a key associated with a data packet, port selection logic 208 may receive forwarding entries (or traffic customization information which is used to generate forwarding entries) from operating system 212 and configure itself to implement the forwarding entries. For example, port selection logic 208 may store forwarding entries associated with a particular port in a content addressable memory, such as a TCAM 224. When a packet is received on that port, the key generated by key construction logic 218 (and any other suitable information associated with the packet) may be passed to the port selection logic 220. The port selection logic 220 uses the key to perform a lookup in the TCAM 224. Port selection logic 220 will then forward the traffic through the appropriate port of network element 108 in accordance with the forwarding entry that matches the information in the key from the packet (and has the highest priority if multiple forwarding entries match the key). If the packet is to be redirected (e.g., because the key matches parameters specified by a forwarding entry that specifies redirection), packet modification logic may modify the appropriate fields of the packet if needed (e.g., destination IP address and/or destination MAC address) before the packet is forwarded out of the appropriate egress port of network element 108. If the packet is not to be redirected (e.g., the packet may be received on an ingress port that is not being load balanced or it may not match any of the forwarding entries that load balance the traffic), then the usual forwarding process may be applied to the packet. For example, port selection logic 218 may access a forwarding table (e.g., based on a destination address (e.g., IP address) of the packet) to determine which port to forward the packet to. In some embodiments, the forwarding table is stored in a separate memory (e.g., static random access memory) from the forwarding entries (e.g., TCAM 224). Thus, in various embodiments, network element 108 may performs network traffic bridging (e.g., L2 bridging) based on forwarding tables linking destination media access control (MAC) addresses with ports of the network element 108.

In particular embodiments, any or a combination of the parsing of the packet, the construction of the key, and the identification of a forwarding entry applicable to a packet may occur at a line rate of the network element (e.g., within a single cycle of a clock of the network element used to clock incoming data).

As mentioned above, the forwarding entries for a particular port may be generated based on the load balancing scheme and associated device group for that port, information which may be supplied by the user. A device group may be one or more network nodes 104 associated with a load balancing scheme. For example, the network nodes 104 of a device group may be indicated by any suitable identifiers. For example, the network nodes 104 of a device group may be identified by their IP addresses (e.g., "1.1.1.1", "1.1.1.2", "1.1.1.3", and "1.1.1.4"). The network traffic may be load balanced among the network nodes specified by the device group.

Each forwarding entry generated from the load balancing scheme corresponds to a network node in the device group and may include an identifier of the corresponding network node. For example, a forwarding entry may include a port identifier associated with a port coupled to the corresponding network node. Each of the forwarding entries may specify that traffic matching criteria specified in the forwarding entry should be redirected to the port specified in the forwarding entry. When the forwarding entry is part of a load balancing scheme, the matching criteria may include one or more transport layer source and/or destination port numbers or portions thereof.

In other embodiments, any other actions may be applied to incoming traffic. For example, particular traffic could be redirected, blocked, or permitted according to any suitable criteria set by the network administrator, network element 108, and/or other entity.

FIG. 3 illustrates example load balancing criteria specifying transport layer source port based load balancing and traffic forwarding entries in accordance with certain embodiments. In the embodiment depicted, block 300 represents example load balancing criteria and block 350 represents example traffic forwarding entries 352. In various embodiments, such entries could be utilized by forwarding logic 208 (e.g., the entries may be stored in TCAM 224 and utilized by hardware to forward incoming network traffic).

The load balancing criteria 300 in the embodiment depicted includes a device group consisting of four network nodes having respective IP addresses of 1.1.1.1, 1.1.1.2, 1.1.1.3, and 1.1.1.4, though network nodes may be specified in any suitable manner. The load balancing criteria 300 also includes identification of four transport layer destination ports (80, 102, 5222, and 5223) associated with network traffic that should be load balanced. Thus the load balancing criteria in this depiction specifies that network traffic having a transport layer destination port of 80, 201, 5222, or 5223 will be load balanced among the four specified network nodes based on the transport layer source ports of the network traffic.

Block 350 represents traffic forwarding entries that may be produced based on the load balancing criteria specified in block 300. The forwarding entries 352 each correspond to a network node in the device group. Each network node is coupled to a port of the network element 108 identified by one of the port identifiers (e.g., 0x60, 0x61, 0x5f, and 0x62). Each forwarding entry 352 specifies that traffic having a transport layer destination port of 80, 102, 5222, or 5223 will be redirected to the specified port (and corresponding network node) based on its transport layer source port. Each of the forwarding entries 352 will result in the redirection of traffic matching the transport layer destination port to an egress port of the network element 108 based on the value of the transport layer source port of the traffic. In this example, the traffic is load balanced evenly across the network nodes of the device group (in some embodiments there are 65,536 possible different values for transport layer port numbers), though in other embodiments (e.g., where weights are assigned unevenly to the network nodes of the device group) a heavier load of traffic could be redirected to a particular network node if desired by specifying a larger range of transport layer source ports in the forwarding entry corresponding to that network node and a smaller load of traffic could be redirected to a particular network node by specifying a smaller range of transport layer source ports in the forwarding entry corresponding to that network node.

In some embodiments, other forwarding entries may be generated. For example, a forwarding entry that permits (without load balancing) all traffic may be created. In such an embodiment, this catch-all forwarding entry would have a lower priority than forwarding entries 352 such that it would only be applied if network traffic didn't match any of the forwarding entries 352. The permitted traffic that does not match one of the load balancing forwarding entries would be forwarded in a normal manner (e.g., based on a destination MAC address of the packet using a forwarding table).

This embodiment is a simplified example. In other embodiments, other actions may be applied to incoming traffic. For example, particular traffic could be redirected, blocked, or permitted according to any suitable criteria set by the network administrator, network element 108, and/or other entity.

In one embodiment, each forwarding entry may merely specify a portion of the transport layer source port (e.g., the two most significant bits) and/or the transport layer destination port. For example, in the embodiment depicted, a binary value of the two most significant bits for source ports 0-16383 as depicted in forwarding entry 352*a* would be "00", a binary value of the two most significant bits for source ports 16384-32767 as depicted in forwarding entry 352*b* would be "01", a binary value of the two most significant bits for source ports 32768-49151 as depicted in forwarding entry 352*c* would be "10", and a binary value of the two most significant bits for source ports 49152-6535 as depicted in forwarding entry 352*d* would be "11". Thus, only the two most significant bits of the transport layer source port would need to be checked to determine which forwarding rule applies to the network traffic. As another example, if the load balancing method is transport layer source port based, each forwarding entry might specify a different value for the two least significant bits of the transport layer source port, such that if a source node creates multiple network connections and increments the transport layer source port by one each time, connections having successive source port numbers will be directed to different nodes of the device group (otherwise there is a possibility that the first 16,384 connections from a node would be routed to the same network node of the device group before connections are routed to the next network node).

In various embodiments, a stateful connection may be established between network nodes 304 and 316, such that if traffic from a particular network node 104*f* to server 116*a* is load balanced to a firewall 104*a*, then return traffic from server 116*a* to network node 104*f* may pass through the same firewall 104*a*. This may be accomplished by having forwarding entries for an ingress port that receives traffic from network node 104*f* correspond to forwarding entries for an ingress port that receives traffic from server 116*a* (with the transport layer source and destination ports reversed in the forwarding entries for the ingress port for the server 116*a* as compared with the forwarding entries for the ingress port for the network node 104*f*). Thus, if the "Destination L4 Port" and "Source L4 Port" labels were swapped, the forwarding entries depicted in FIG. 3 could be used for an ingress port that would accept return traffic from the destination node(s).

Using the forwarding tables of FIG. 3 as an example, if the device group changed, the forwarding entries could be automatically updated by network element to take the change into account. For example, if one of the network nodes of the device group went down, the range of transport layer source ports specified by each forwarding entry would increase such that each forwarding entry would cover ⅓ of the expected range of source ports. Similarly, if an additional network node was added to the device group, the range of transport layer source ports specified by each forwarding entry would decrease such that each forwarding entry would cover ⅕ of the expected range of source ports.

FIG. 4 illustrates example load balancing criteria specifying transport layer destination port based load balancing and traffic forwarding entries in accordance with certain embodiments. In the embodiment depicted, block 400 represents example load balancing criteria and block 450 represents example traffic forwarding entries 452. In various embodiments, such entries could be utilized by forwarding logic 208 (e.g., the entries may be stored in TCAM 224 and utilized by hardware to forward incoming network traffic).

The load balancing criteria 400 in the embodiment depicted includes a device group consisting of four network nodes having respective IP addresses of 1.1.1.1, 1.1.1.2, 1.1.1.3, and 1.1.1.4, though network nodes may be specified in any suitable manner. The load balancing criteria 400 also includes identification of one transport layer source port (80) associated with network traffic that should be load balanced. Thus the load balancing criteria in this depiction specifies that network traffic having a transport layer source port of 80 will be load balanced among the four specified network nodes based on transport layer destination ports of the network traffic.

Block 450 represents traffic forwarding entries that may be produced based on the load balancing criteria specified in block 400. The forwarding entries 452 each correspond to a network node in the device group. Each network node is coupled to a port of the network element 108 identified by one of the port identifiers (e.g., 0x60, 0x61, 0x5f, and 0x62). Each forwarding entry 452 specifies that traffic having a transport layer source port of 80 will be redirected to the specified port (and corresponding network node) based on its transport layer destination port. Each of the forwarding entries 452 will result in the redirection of traffic matching the transport layer source port to an egress port of the network element 108 based on the value of the transport layer destination port of the traffic. In this example, the traffic is load balanced evenly across the network nodes of the device group (this example uses a subset of the total available transport layer destination port values) though in other embodiments (e.g., where weights are assigned unevenly to the network nodes of the device group) a heavier load of traffic could be redirected to a particular network node if desired by specifying a larger range of transport layer destination ports in the forwarding entry corresponding to that network node and a smaller load of traffic could be redirected to a particular network node by specifying a smaller range of transport layer destination ports in the forwarding entry corresponding to that network node.

In some embodiments, other forwarding entries may be generated. For example, a forwarding entry that permits (without load balancing) all traffic may be created. In such an embodiment, this catch-all forwarding entry would have a lower priority than forwarding entries 452 such that it would only be applied if network traffic didn't match any of the forwarding entries 452. The permitted traffic that does not match one of the load balancing forwarding entries would be forwarded in a normal manner (e.g., based on a destination MAC address of the packet using a forwarding table).

Figure 5:
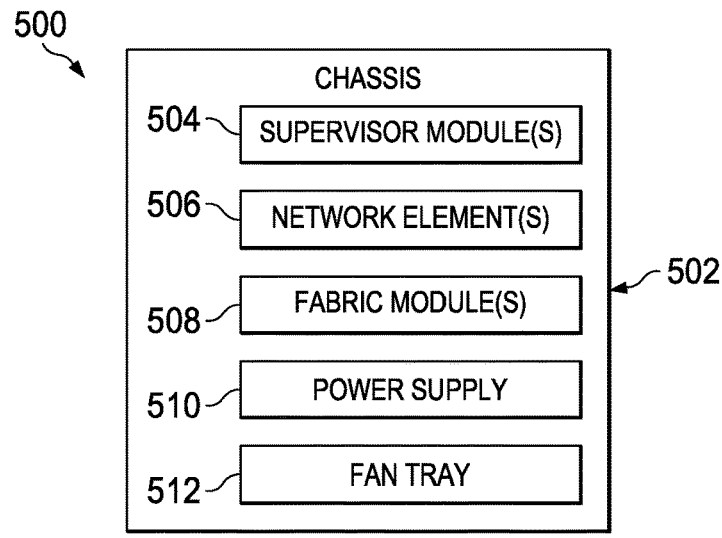
FIG. 5 illustrates a block diagram of one or more network elements embodied within a chassis in accordance with certain embodiments.

FIG. 5 illustrates a block diagram 500 of one or more network elements embodied within a chassis 502 in accordance with certain embodiments. Chassis 502 may include various slots configured to electrically and mechanically couple to various circuit boards (e.g., line cards), such as one or more supervisor module(s) 504, one or more network elements(s) 506, one or more fabric module(s) 508, one or more power supplies (510), one or more fan trays 512, or other components. In various embodiments, a network element 508 may correspond to network element 108, 108a, or 108b. In other embodiments, the entire chassis 502 may correspond to network element 108. In one embodiment, the network element 108 shown in FIG. 1, may be network element 508 integrated in chassis 502.

A supervisor module 504 may include a computer system with at least one processor and may be operable to scale the control plane, management, and data plane services for the chassis and its components. A supervisor module 504 may control the Layer 2 and 3 services, redundancy capabilities, configuration management, status monitoring, power and environmental management of the chassis and its components. In some embodiments, supervisor module 504 provides centralized arbitration to the system fabric for all line cards.

Supervisor module 504 may run an operating system, such as Cisco NX-OS or other operating system, designed to support distributed multithreaded processing on symmetric multiprocessors (SMPs), multicore CPUs, and distributed line-card processors. Computationally intensive tasks, such as hardware table programming, can be offloaded to dedicated processors distributed across the line cards. Modular processes of the operating system may be instantiated on demand, each in a separate protected memory space. Thus, processes are started and system resources allocated only when a feature is enabled.

In a particular embodiment supervisor module 504 receives commands from users, processes these commands, and sends relevant configuration information to the network elements 506. For example, a user may send traffic customization information for one or more ports to supervisor module 504. Supervisor module may generate traffic forwarding entries based on the traffic customization information. Supervisor module 504 may also determine which ports the traffic customization information applies to and then send the forwarding entries to the relevant network element 506.

Network element 506 may include a distributed forwarding engine for L2/L3 forwarding. Network element 506 may include integrated hardware support for protecting the supervisor CPU from excessive traffic; for providing access control list (ACL) counters and logging capability, for providing Layer 2 to Layer 4 ACL for both IPv4 and IPv6 traffic, and any other characteristics described herein with respect to network element 108.

Fabric module 508 is capable of coupling the various network elements 506 in the chassis together (e.g., through their respective ports). In connection with the supervisor module 504 and network elements 506, the fabric module 508 may provide virtual output queuing (VoQ) and credit-based arbitration to a crossbar switch to increase performance of the distributed forwarding system implemented by chassis 502.

Chassis 502 may also include one or more power supplies 510 for powering the various components of chassis 502 and one or more fan trays 512 for cooling the various components of chassis 502.

Figure 6:
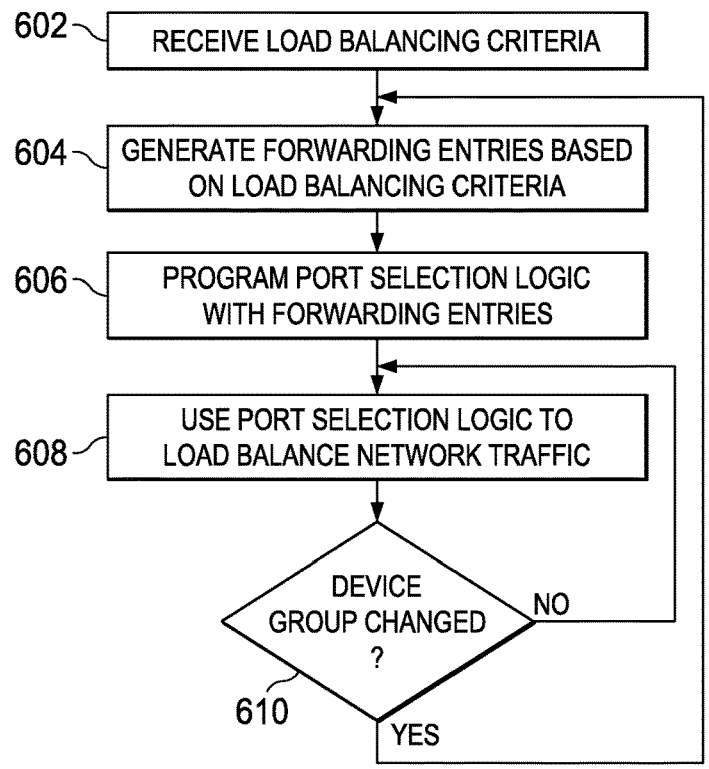
FIG. 6 illustrates an example method for load balancing network traffic based on transport layer port numbers in accordance with certain embodiments.

FIG. 6 illustrates an example method for load balancing network traffic in accordance with certain embodiments. The method begins at step 602, where load balancing criteria is received. For example, the load balancing criteria may specify a load balancing method such as a transport layer source port based load balancing method or a transport layer destination port based load balancing method. The load balancing criteria may also specify transport layer ports associated with network traffic that is to be load balanced. The load balancing criteria may also specify a device group. The device group may include any suitable number of network nodes coupled to a network element and operable to receive load balanced traffic from the network element. In various embodiments, the load balancing criteria may be received from a user of a network node coupled to the network element or may be received directly at the network element.

At step 604, traffic forwarding entries are generated based on the load balancing criteria. The forwarding entries may collectively specify a load balancing scheme. Each entry may specify one of the network nodes in the device group and criteria that when matched results in the redirection of network traffic to the specified network node.

At step 606, port selection logic of the network element is programmed with the forwarding entries. As one example, the forwarding entries may be loaded into a memory of the network element. In some embodiments, this memory is a content addressable memory, such as a TCAM. In one embodiment, the port selection logic comprises fixed logic with variable behavior based on the forwarding entries loaded in the memory.

At step 608, the port selection logic is used to load balance incoming network traffic. For example, the port selection logic may compare all or a portion of a transport layer source port and/or transport layer destination port of the network traffic against one or more of the forwarding entries and redirect the traffic when a match with a particular forwarding entry is found. As another example, the port selection logic may also compare any other suitable characteristics of the network traffic to determine whether the forwarding entry is applicable to the network traffic.

At step 610 it is determined whether the device group has changed. For example, the device group may change when a user specifies a new device group or when a network node of an existing device group goes online or offline. If the device group has not changed, traffic continues to be load balanced at step 608. If the device group has changed, new traffic forwarding entries are generated at step 604 to reflect the new device group, the new entries are programmed at step 606, and load balancing continues at step 608.

Some of the steps illustrated in FIG. 6 may be repeated, combined, modified or deleted where appropriate, and additional steps may also be added to the flowchart. Additionally, steps may be performed in any suitable order without departing from the scope of particular embodiments.

It is also important to note that the steps in FIG. 6 illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the network elements 108 in that any suitable arrangements, chronologies, configurations, and timing mechanisms may be provided without departing from the teachings of the present disclosure.

Additionally, it should be noted that with the examples provided above, interaction may be described in terms of one or more network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of load balancing network traffic, as potentially applied to a myriad of other architectures.

"Logic" as used herein may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, at a network element that performs network traffic bridging, load balancing criteria comprising an indication of at least one transport layer port number and an indication of a plurality of network nodes;
creating a plurality of forwarding entries based on the load balancing criteria, a forwarding entry specifying the at least one transport layer port number and a network node of the plurality of network nodes;
constructing, based on the plurality of forwarding entries and network traffic, a key representing the at least one transport layer port number;
determining whether the network traffic is to be load balanced, wherein when the network element uses a destination port based load balancing scheme, the network traffic is load balanced when a source port of the network traffic matches a predetermined list of source ports;
when the network traffic is to be load balanced:
using the key, performing, by the network element, a lookup to identify a matching forwarding entry from the plurality of forwarding entries, wherein when the network element uses the destination port based load balancing scheme, the matching forwarding entry specifies that an egress port of the network traffic is based on a destination port of the network traffic, and when the network element uses a source port based load balancing scheme, the matching forwarding entry specifies that an egress port of the network traffic is based on the source port of the network traffic; and
using the matching forwarding entry to load balance, among the plurality of network nodes, the network traffic used to construct the key.

2. The method of claim 1, wherein the load balancing criteria further specifies that the at least one transport layer port number corresponds to a source port.

3. The method of claim 2, wherein each forwarding entry further specifies a distinct plurality of transport layer destination port numbers.

4. The method of claim 1, wherein the load balancing criteria further specifies that the at least one transport layer port number corresponds to a destination port.

5. The method of claim 4, wherein each forwarding entry further specifies a distinct plurality of transport layer source port numbers.

6. The method of claim 1, further comprising:
detecting that a network node of the plurality of network nodes has become unavailable;
creating a second plurality of forwarding entries based on the load balancing criteria, a forwarding entry of the second plurality of forwarding entries specifying the at least one transport layer port number and a network node of the remaining available network nodes;
constructing, based on the second plurality of forwarding entries and network traffic, a key representing the at least one transport layer port number;
using the key, performing, by the network element, a lookup to identify a matching forwarding entry from the second plurality of forwarding entries; and
using the matching forwarding entry from the second plurality of forwarding entries to load balance, among the plurality of remaining available network nodes, network traffic used to construct the key.

7. The method of claim 1, wherein the network element performs a lookup to identify the matching forwarding entry of the plurality of forwarding entries within a single clock cycle of the network element.

8. The method of claim 1, wherein the network traffic is load balanced at a line rate of the network element.

9. The method of claim 1, wherein the plurality of forwarding entries are stored in a ternary content-addressable memory (TCAM) of the network element.

10. The method of claim 1, further comprising accessing a forwarding table of the network element to determine an egress port for network traffic that does not meet the load balancing criteria.

11. An apparatus comprising:
an interface to receive load balancing criteria comprising an indication of at least one transport layer port number and an indication of a plurality of network nodes;
at least one memory element to store a plurality of forwarding entries based on the load balancing criteria, a forwarding entry specifying the at least one transport layer port number and a network node of the plurality of network nodes; and
forwarding logic containing a processor to:
receive network traffic;

perform network traffic bridging on a first portion of the network traffic;

construct, based on the plurality of forwarding entries and a second portion of the network traffic, a key representing the at least one transport layer port number;

determine whether the network traffic is to be load balanced, wherein when a destination port based load balancing scheme is used, the network traffic is load balanced when a source port of the network traffic matches a predetermined list of source ports;

when the network traffic is to be load balanced:
  using the key, perform a lookup using the key to identify a matching forwarding entry from the plurality of forwarding entries, wherein when the forwarding logic uses the destination port based load balancing scheme, the matching forwarding entry specifies that an egress port of the network traffic is based on a destination port of the network traffic, and when the forwarding logic uses a source port based load balancing scheme, the matching forwarding entry specifies that an egress port of the network traffic is based on the source port of the network traffic; and
  use the matching forwarding entry to load balance, among the plurality of network nodes, the second portion of the network traffic used to construct the key.

12. The apparatus of claim 11, wherein the load balancing criteria further specifies that the at least one transport layer port number corresponds to a source port.

13. The apparatus of claim 11, wherein each forwarding entry further specifies a distinct plurality of transport layer destination port numbers.

14. The apparatus of claim 11, wherein the load balancing criteria further specifies that the at least one transport layer port number corresponds to a destination port.

15. The apparatus of claim 11, wherein each forwarding entry further specifies a distinct plurality of transport layer source port numbers.

16. A computer-readable non-transitory medium comprising one or more instructions that when executed by a processor configure the processor to cause programmable logic to perform operations comprising:
  receiving, at a network element that performs network traffic bridging, load balancing criteria comprising an indication of at least one transport layer port number and an indication of a plurality of network nodes;

creating a plurality of forwarding entries based on the load balancing criteria, a forwarding entry specifying the at least one transport layer port number and a network node of the plurality of network nodes;

constructing, based on the plurality of forwarding entries and network traffic, a key representing the at least one transport layer port number;

determining whether the network traffic is to be load balanced, wherein when the network element uses a destination port based load balancing scheme, the network traffic is load balanced when a source port of the network traffic matches a predetermined list of source ports;

when the network traffic is to be load balanced:
  using the key, performing, by the network element, a lookup to identify a matching forwarding entry from the plurality of forwarding entries, wherein when the network element uses the destination port based load balancing scheme, the matching forwarding entry specifies that an egress port of the network traffic is based on a destination port of the network traffic, and when the network element uses a source port based load balancing scheme, the matching forwarding entry specifies that an egress port of the network traffic is based on the source port of the network traffic; and
  using the matching forwarding entry to load balance, among the plurality of network nodes, network traffic used to construct the key.

17. The medium of claim 16, wherein the load balancing criteria further specifies that the at least one transport layer port number corresponds to a source port.

18. The medium of claim 16, wherein each forwarding entry further specifies a distinct plurality of transport layer destination port numbers.

19. The medium of claim 16, wherein the load balancing criteria further specifies that the at least one transport layer port number corresponds to a destination port.

20. The medium of claim 16, wherein each forwarding entry further specifies a distinct plurality of transport layer source port numbers.

* * * * *